United States Patent
Nakamura et al.

(10) Patent No.: US 7,902,835 B2
(45) Date of Patent: Mar. 8, 2011

(54) TRANSMISSION LINE DRIVING CIRCUIT

(75) Inventors: Takayuki Nakamura, Tokyo (JP);
Takashi Sekino, Tokyo (JP)

(73) Assignee: Advantest Corporation, Tokyo (JP)

( * ) Notice: Subject to any disclaimer, the term of this patent is extended or adjusted under 35 U.S.C. 154(b) by 628 days.

(21) Appl. No.: 11/916,232

(22) PCT Filed: May 18, 2006

(86) PCT No.: PCT/JP2006/309922
§ 371 (c)(1),
(2), (4) Date: Nov. 30, 2007

(87) PCT Pub. No.: WO2006/129490
PCT Pub. Date: Dec. 7, 2006

(65) Prior Publication Data
US 2009/0322395 A1 Dec. 31, 2009

(30) Foreign Application Priority Data

Jun. 1, 2005 (JP) ................................ 2005-160833

(51) Int. Cl.
*G01R 29/26* (2006.01)
*G01R 27/28* (2006.01)
(52) U.S. Cl. ........................................ 324/616; 324/613
(58) Field of Classification Search ................. 324/613, 324/616
See application file for complete search history.

(56) References Cited

U.S. PATENT DOCUMENTS

| 6,704,365 B2 | 3/2004 | Haycock |
| 7,496,150 B2 * | 2/2009 | Canella et al. ................ 375/295 |

FOREIGN PATENT DOCUMENTS

| CN | 1122500 A | 5/1996 |
| JP | 9-331363 A | 12/1997 |
| JP | 2001-45072 A | 2/2001 |
| JP | 2002-135340 A | 5/2002 |
| JP | 2005-57686 A | 3/2005 |

* cited by examiner

*Primary Examiner* — Amy He
(74) *Attorney, Agent, or Firm* — patenttm.us

(57) ABSTRACT

A transmission line driving circuit that can support a high-rate signal transmission and further can perform appropriate loss compensation in accordance with a signal pattern. A transmission line driving circuit 1 comprises a plurality of driver input circuits 20 that serve as signal analyzing unit for analyzing the content of the signal pattern of an input signal; a plurality of lowpass filters 30; a plurality of gain adjusting circuits 40; a plurality of adders 50; and adder 52; and a driver output circuit 60 that outputs, in accordance with a signal analysis result, a signal the phase of which has been adjusted in such a direction that cancels the timing deviation caused by a loss occurring when the input signal is transmitted to the transmission path. The output signal from the driver output circuit 60 is transmitted to the transmission path 2.

5 Claims, 4 Drawing Sheets (A)

t10 t11

(B)

t20    t21

(C)

t30 t31

TRANSMISSION LINE DRIVING CIRCUIT

TECHNICAL FIELD

The present invention relates to a transmission line driving circuit for compensating for timing accuracy reduced by a loss of a transmission line in a semiconductor tester and so on.

BACKGROUND ART

In semiconductor testers, it is necessary to transmit a number of signals between signal generating circuits and devices under test (hereinafter, will be referred to as DUTs). Thus transmission lines are formed using relatively thin coaxial cables and strip lines or microstrip lines and the like that are formed with small wiring widths on multilayer wiring boards. On such transmission lines, a large conductor loss or dielectric loss occurs due to skin effect. Further, in actual semiconductor testers, losses are caused by connectors and sockets in addition to losses of transmission lines. Therefore, signal waveforms deteriorate on the ends of DUTs due to these losses. In a known conventional technique for compensating for the deterioration of signal waveforms, including a frequency compensating circuit made up of a resistor and a coil, and a transition signal driving unit made up of a switch, a capacitor, and a current mirror circuit and the like are added to a transmitter driver for transmitting a signal to a transmission line (for example, see patent document 1). By means of the frequency compensating circuit and the transition signal driving unit, peaking current is generated at the rising edge or the falling edge of a transmission signal and the deterioration of a signal waveform on an end of a DUT is prevented.
[Patent document 1] Japanese Patent Laid-Open No. 10-190747 (pp. 2 to 5, FIGS. 1 to 9)

DISCLOSURE OF THE INVENTION

In recent years, the number of DUT pins has increased and DUTs have become faster. Thus greater compensation for a loss has been demanded and it is accordingly necessary to increase the maximum output voltages of signal generating circuits. However, a demand for the generation of high-speed signals and the generation of large-amplitude signals are contradictory to each other and it is difficult to satisfy both of the demands in the method disclosed in patent document 1. Moreover, in the technique disclosed in patent document 1, a constant peaking current is generated regardless of the signal patterns of the transmission signal, so that the technique cannot respond to a loss changing with the signal patterns.

The present invention is designed in view of this point. An object of the present invention is to provide a transmission line driving circuit which can respond to a higher speed of a transmission signal and properly compensate for a loss according to a signal pattern.

In order to solve the above problem, a transmission line driving circuit of the present invention includes a signal analyzing unit for analyzing the contents of the signal pattern of an input signal, and a phase adjusting unit for outputting a signal obtained by adjusting the phase of the input signal in such a direction that cancels a timing deviation caused by a loss occurring when the input signal is transmitted to a transmission line, wherein the transmission line driving circuit transmits an output signal of the phase adjusting unit to the transmission line. A loss on the transmission line changes a timing of when the signal received through the transmission line exceeds or falls below a predetermined threshold value. If sometimes a transition is not completely made from a high level to a low level or vice versa according to a pattern, the timing of the rising edge and the timing of the falling edge change in accordance with patterns on the reception side. Thus the phase of the signal is adjusted so as to cancel a change of timing before the signal is inputted to the transmission line, so that a loss can be properly compensated. Particularly, since it is not necessary to increase the amplitude of the signal to compensate for a loss, it is possible to easily respond to a higher speed of a transmission signal. The phase is adjusted according to the contents of the signal pattern of the input signal, so that a loss can be properly compensated according to the signal pattern.

It is desirable that the signal analyzing unit analyze the frequency characteristics of the input signal. By adjusting the phase in consideration of the frequency characteristics of the input signal, when a high frequency signal is transmitted through a transmission line, even if the signal does not completely change from a low level to a high level or vice versa on the reception side, it is possible to adjust a timing when the signal passes through the predetermined threshold voltage, thereby easily responding to a higher speed of the transmission signal.

Further it is desirable that the signal analyzing unit has a filter for passing the low frequency components of the input signal and the phase adjusting unit adjusts the phase according to the output voltage of the filter. Thus the frequency characteristics of the input signal can be easily detected.

Moreover, it is desirable that the signal analyzing unit has a plurality of filters having different cutoff frequencies for passing the low frequency components of the input signal and a combining unit for combining the output voltages of the plurality of filters, and it is desirable that the phase adjusting unit adjusts the phase according to the combined voltage of the combining unit. Thus it is possible to perform appropriate loss compensation according to the actual loss of the transmission line.

Moreover, it is desirable that the signal analyzing unit has a gain adjusting unit for adjusting the gain of the output voltage of the filter. Particularly, it is desirable that the gain adjusted by the gain adjusting unit be set according to a degree of a signal loss caused by the transmission line. Thus it is possible to adjust the phase of the signal in consideration of the characteristics of the transmission line and compensate loss for various transmission lines by means of a shared circuit.

Moreover, it is desirable that the phase adjusting unit be a differential amplifier that a reference voltage is changed according to an analysis result of the signal analyzing unit. Alternatively, it is desirable that the phase adjusting unit be a voltage comparator that a reference voltage is changed according to an analysis result of the signal analyzing unit. It is desirable that the phase adjusting unit be a variable delay circuit that a delay amount is changed according to an analysis result of the signal analyzing unit. Thus it is possible to easily change the timing of a change of the signal (the phase of the signal) transmitted to the transmission line with reliability.

Further, it is desirable that the signal analyzing unit and the phase adjusting unit be included in a chip or a module where a circuit for outputting the input signal is formed. Thus it is possible to reduce the size of the overall configuration including the transmission line driving circuit and the circuit for outputting the input signal and reduce the cost due to the simplified manufacturing process and a reduction in the number of components.

DESCRIPTION OF SYMBOLS

Figure 1:
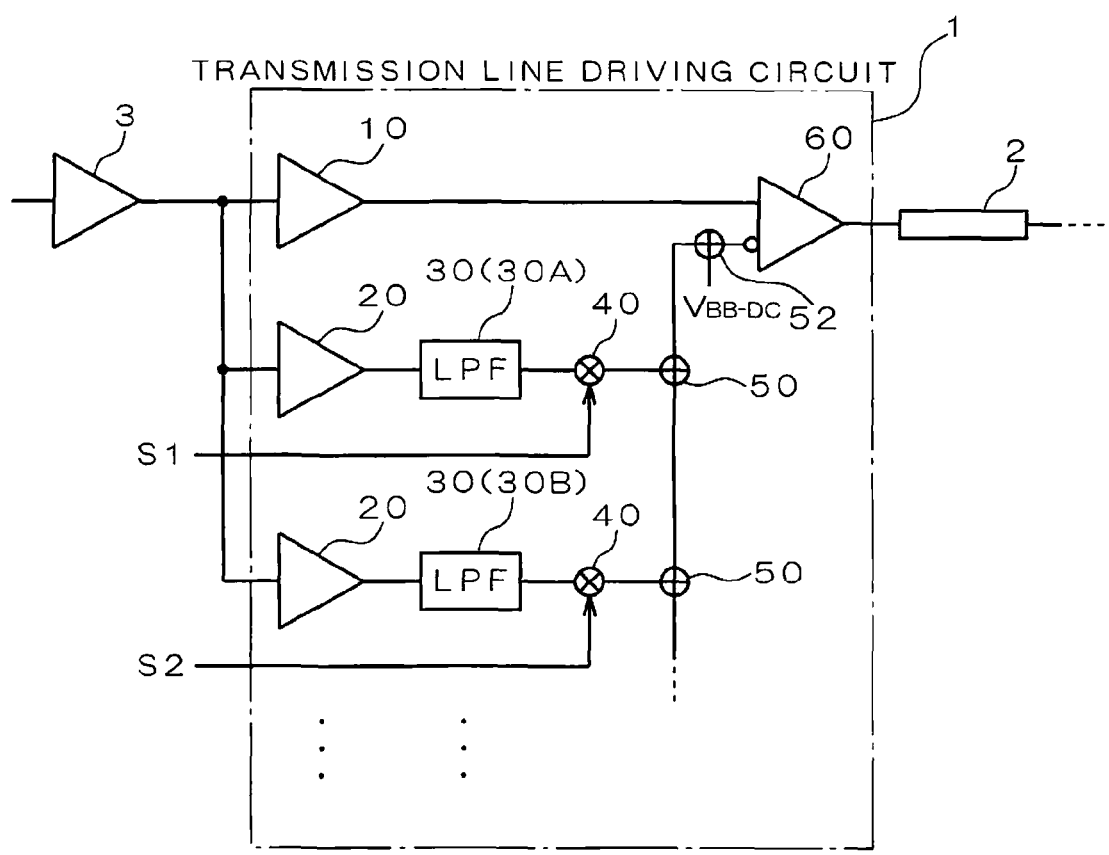
FIG. 1 is a view that illustrates the configuration of the transmission line driving circuit according to an embodiment.

1 Transmission line driving circuit
2 Transmission line
3 Driver
10, 20 Driver input circuits
30 Low-pass filters (LPFs)
40 Gain adjusting circuits
50, 52 Adders
60 Driver output circuit
100 First circuit
102, 104, 120, 202, 204, 220 Transistors
106, 206 Variable constant current circuits
110, 112, 210, 212, 302, 310, 312, 314 Resistors
114, 214 capacitors
122, 222, 304 Constant current circuits
200 Second circuit

BEST MODE FOR CARRYING OUT THE INVENTION

A transmission line driving circuit according to an embodiment of the present invention will now be specifically described with reference to the accompanying drawings.

FIG. 1 illustrates the configuration of the transmission line driving circuit according to an embodiment. As shown in FIG. 1, a transmission line driving circuit 1 of the present embodiment includes a driver input circuit 10, a plurality of driver input circuits 20, a plurality of low-pass filters (LPFs) 30 (30A, 30B, . . . ), a plurality of gain adjusting circuits 40, a plurality of adders 50, an adder 52, and a driver output circuit 60. The transmission line driving circuit 1 is provided between a transmission line 2 on which a loss occurs and a driver 3 that is provided in the previous stage of the transmission line driving circuit 1 and transmits a signal to the transmission line 2. The transmission line driving circuit 1 performs an operation of adjusting the timing of a change of a signal according to a signal pattern transmitted to the transmission line 2.

The driver input circuit 10 is fed with a signal outputted from the driver 3. The driver input circuit 10 performs waveform shaping on the signal and outputs a signal in phase with the signal. The signal is inputted to the driver output circuit 60 including a differential amplifier. The driver input circuits 20 perform the same operations as the driver input circuit 10 and output signals in phase with driver pattern signals outputted from the driver 3. The low-pass filters 30 (30A, 30B, . . . ) pass the low frequency components of the signals outputted from the corresponding driver input circuits 20, respectively. Each of the gain adjusting circuits 40 can set gains in response to control data S1, S2, . . . that are inputted from the outside. The gain adjusting circuits 40 amplify or attenuate, with the set gains, voltages corresponding to the low-frequency components outputted from the corresponding low-pass filters 30, respectively, and then output the voltages. In the present embodiment, there are provided a plurality of processing systems, each including the driver input circuit 20, the low-pass filter 30, and the gain adjusting circuit 40. Each of the adders 50 add the output voltages of the plurality of gain adjusting circuits 40 included in the plurality of processing systems. The adder 52 adds the added voltage of the plurality of adders 50 to a predetermined voltage $V_{BB-DC}$ to generate a reference voltage $V_{BB}$. The reference voltage $V_{BB}$ is inputted to the driver output circuit 60. The driver output circuit 60 is fed with the signal outputted from the driver input circuit 10 and the reference signal of the reference voltage $V_{BB}$ outputted from the adder 52, and the driver output circuit 60 performs differential amplification using these two signals. The signal outputted from the driver output circuit 60 is transmitted as the output signal of the transmission line driving circuit 1 to the transmission line 2, and is transmitted to a receiver circuit (not shown).

The plurality of low-pass filters 30 correspond to a signal analyzing unit, the adder 52 and the driver output circuit 60 correspond to a phase adjusting unit, a plurality of adders 50 correspond to a combining unit, and the plurality of gain adjusting circuits 40 correspond to a gain adjusting unit.

The transmission line driving circuit 1 of the present embodiment is configured thus. The following is the operations of the transmission line driving circuit 1. The plurality of low-pass filters 30A, 30B, . . . have different cutoff frequencies and pass different frequency components. When it is difficult for a single filter to compensate for the influence of an actual transmission line, compensation equivalent to the influence of the actual transmission line can be obtained by combining the outputs of the respective filters. Alternatively, some of the filters may be switched to perform compensation.

Figure 2:
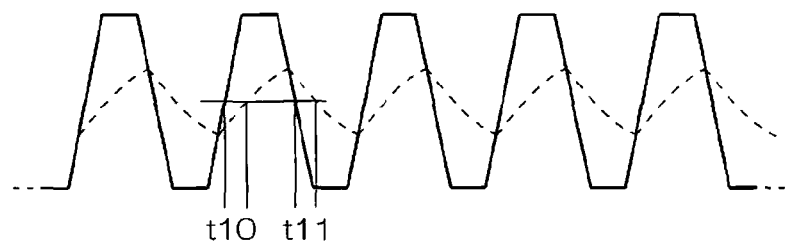
FIG. 2 is an explanatory drawing showing the attenuation of a signal generated by a loss caused by the transmission line.
Figure 2:
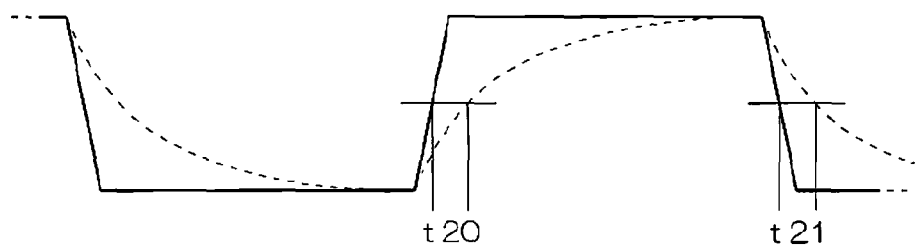
Figure 2:
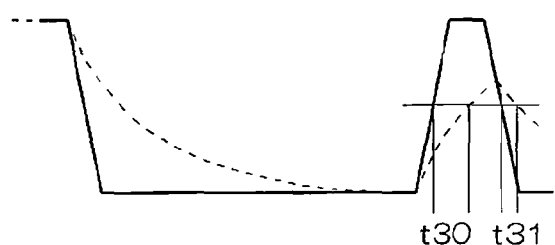

FIG. 2 is an explanatory drawing showing the attenuation of a signal generated by a loss of the transmission line 2. FIG. 2 shows an extremely large loss to explain the attenuation of the signal. In FIG. 2(A), a dotted line indicates a state in which a high frequency signal having a signal pattern A is inputted to the transmission line 2. When the transmission line 2 has a large loss, the subsequent change of the state occurs before the voltage of a signal sufficiently changes from a low level to a high level or vice versa. Timing deviations at this point are represented as t10 and t11. In FIG. 2(B), a dotted line indicates a state in which a low frequency signal having a signal pattern C is inputted to the transmission line 2. When the transmission line 2 has a large loss, it takes a certain time to sufficiently change a signal voltage from a low level to a high level or vice versa. In the signal pattern C, a high-level or low-level period is long, and thus the signal changes up/down to a voltage level close to a high/low level. Timing deviations at this point are represented as t20 ($\neq$t10) and t21 ($\neq$t11). To an actual transmission line 2, a signal obtained by suitably combining the signal of FIG. 2(A) and the signal of FIG. 2(B) is inputted as shown in FIG. 2(C). In the example of FIG. 2(C), at this point, a timing deviation t30 at the rising edge of the signal is equal to the timing deviation t20 at the rising edge of the signal pattern C shown in FIG. 2(B) but a timing deviation t31 at the falling edge of the signal is not equal to the timing deviation t21 at the falling edge of the signal pattern C shown in FIG. 2(B). In this way, the timing deviation at the rising edge and the timing deviation at the falling edge vary according to the patterns of the signal inputted to the transmission line 2.

Each of the gain adjusting circuits 40 provided in the subsequent stage of the respective low-pass filters 30 amplify or attenuate signals relative to the output voltages of the corresponding low-pass filters 30, with gains set according to the control data (S1, S2, . . . ). Characteristics (the amount of loss and the dependence of the loss on a frequency) vary with the length, shape, and so on of the transmission line 2. Thus even the same input signal has different degrees of attenuation after passing through the transmission line 2. For correspondence with the characteristics of the transmission line 2, the contents of the control data S1, S2, . . . are changed and the gains of the gain adjusting circuits 40 are set to be variable. For example, it is preferable that for the plurality of transmission lines 2 having various characteristics, the values of the control data S1, S2, . . . for proper compensation are determined beforehand by experiments, simulations and so on, and the characteristics of the transmission line 2 to be used actually are also measured, and the control data S1, S2, . . . corresponding to the measured characteristics of the transmission line 2 are used.

In the plurality of adders 50, the voltages after the gains are adjusted by the plurality of gain adjusting circuits 40 are added (combined). The adder 52 generates a reference signal having a reference voltage $V_{BB}$ by adding the added voltages of the plurality of adders 50 to a predetermined voltage $V_{BB\text{-}DC}$, and the adder 52 inputs the generated reference signal to the driver output circuit 60. For example, the mean voltage (50% voltage) of the low level and the high level of the input signal is used as the predetermined voltage $V_{BB\text{-}DC}$, and the voltages obtained by superimposing the output voltages of the adder 50 of the final stage obtained by analyzing the frequency components of the input signal by means of the low-pass filters 30 onto the voltage $V_{BB\text{-}DC}$ are inputted to the driver output circuit 60. Therefore, the voltage level of the reference signal inputted to the driver output circuit 60 can be changed with the frequency of the input signal. It is possible to adjust the timing of the rising edge and the falling edge of the signal obtained as a differential amplification output for the voltage level of the reference signal, according to the contents of the signal pattern of the input signal.

As described above, in the transmission line driving circuit 1 of the present embodiment, before the signal is inputted to the transmission line 2, the phase of the signal is adjusted so as to cancel a timing change that is caused by a loss generated by passage through the transmission line 2, so that the loss can be properly compensated. Particularly, since it is not necessary to increase the amplitude of the signal to compensate for a loss, it is possible to easily respond to a higher speed of a transmission signal. Moreover, by adjusting the phase according to the contents of the signal pattern of the input signal, a loss can be properly compensated according to the signal pattern.

Further, by adjusting gains for the output voltages of the low-pass filters 30A, 30B, . . . , the phase of the signal can be adjusted in consideration of the characteristics of the transmission line 2 and a loss can be compensated for various kinds of transmission lines 2 by means of the shared transmission line driving circuit 1. Moreover, since the driver output circuit 60 is a differential amplifier, the timing of a change of the signal (the phase of the signal) transmitted to the transmission line 2 can be easily changed with reliability.

Figure 3:
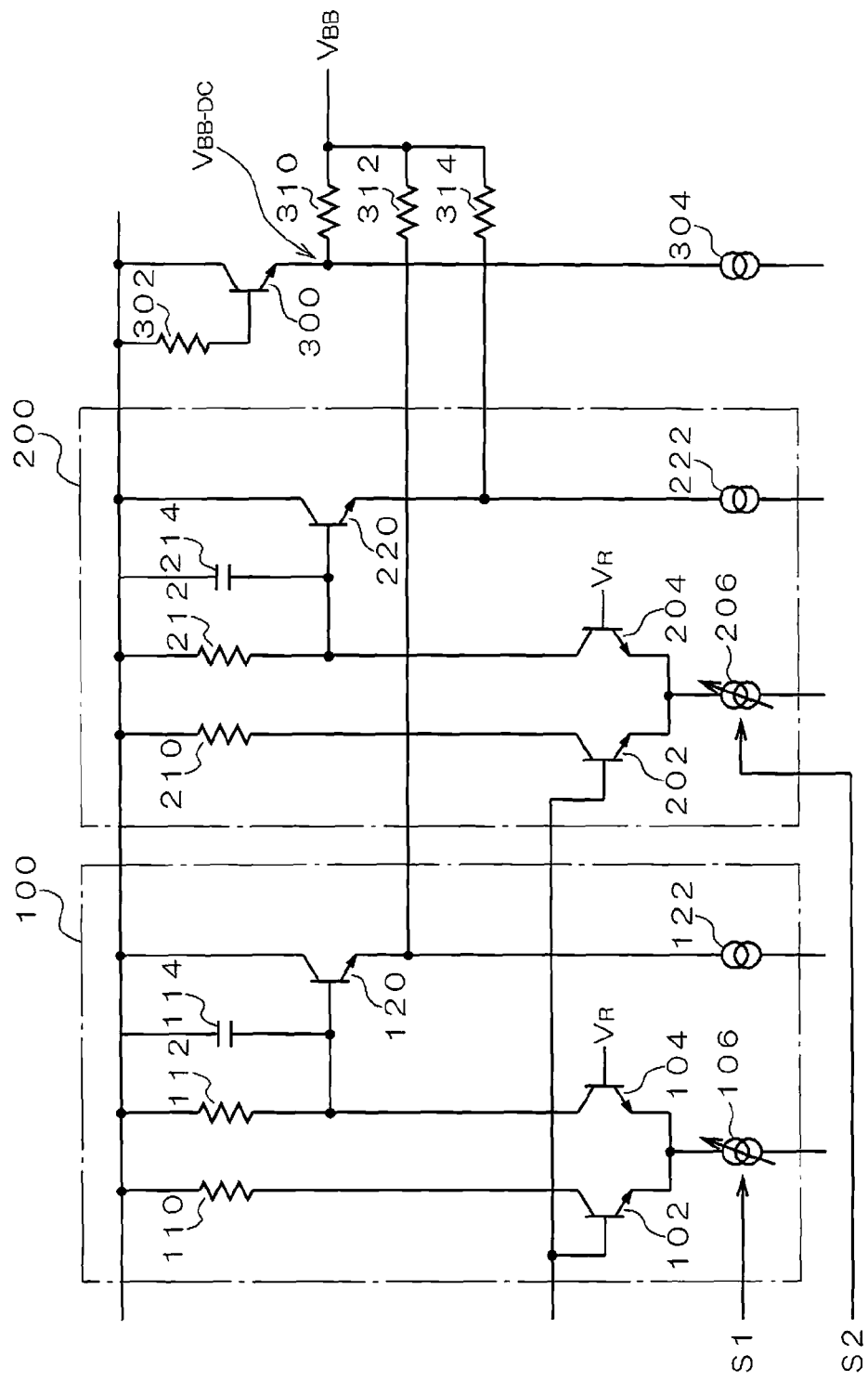
FIG. 3 is a circuit diagram partially showing the specific configuration of the transmission line driving circuit.

FIG. 3 is a circuit diagram partially showing the specific configuration of the transmission line driving circuit 1. In the configuration of FIG. 3, a specific configuration from the driver input circuit 20 to the adder 52 that is shown in FIG. 1 is shown for two processing systems. The configuration of FIG. 3 includes a first circuit 100 corresponding to one of the processing systems, a second circuit 200 corresponding to the other processing system, a transistor 300 for generating the predetermined voltage $V_{BB\text{-}DC}$, a resistor 302, a constant current circuit 304, and three resistors 310, 312, and 314 for adding the output voltages of the two processing systems to the predetermined voltage $V_{BB\text{-}DC}$.

The first circuit 100 includes two transistors 102 and 104 composing a differential amplifier, a variable constant current circuit 106 connected to the emitters of the two transistors 102 and 104 in a shared manner, resistors 110 and 112 serving as load resistors connected respectively to the collectors of the two transistors 102 and 104, a capacitor 114 connected in parallel with the resistor 112, and a transistor 120 and a constant current circuit 122 that are connected to the collector of the transistor 104.

The base of the transistor 102 is fed with the signal outputted from the driver 3. The base of the transistor 104 is fed with a reference signal having a predetermined reference voltage (e.g., the mean voltage of the low level and the high level of the signal inputted to the transistor 102) $V_R$. Therefore, a signal in phase with the signal inputted to the transistor 102 is outputted from the collector of the transistor 104. The voltage level of the output signal can be varied by changing the constant current output value of the variable constant current circuit 106 according to the control data S1. The signal outputted from the collector of the transistor 104 is smoothed by a low-pass filter made up of the resistor 112 and the capacitor 114, and only low-frequency components equal to or smaller than a cutoff frequency determined by the device constants (resistance value and capacitance value) of the resistor 112 and the capacitor 114 are outputted through the transistor 120. The two transistors 102 and 104 correspond to the driver input circuit 20, the resistor 112 and the capacitor 114 correspond to the low-pass filter 30A, and the variable constant current circuit 106 corresponds to the gain adjusting circuit 40.

The second circuit 200 includes two transistors 202 and 204 composing a differential amplifier, a variable constant current circuit 206 connected to the emitters of the two transistors 202 and 204 in a shared manner, resistors 210 and 212 serving as load resistors connected respectively to the collectors of the two transistors 202 and 204, a capacitor 214 connected in parallel with the resistor 212, and a transistor 220 and a constant current circuit 222 that are connected to the collector of the transistor 204. The configuration and the operations of the parts of the second circuit 200 are basically similar to those of the first circuit 100. The second circuit 200 is different only in the cutoff frequency of the low-pass filter 30B made up of the resistor 212 and the capacitor 214. For example, the low-pass filter 30A made up of the resistor 112 and the capacitor 114 that are included in the first circuit 100 has a cutoff frequency set higher than the cutoff frequency of the low-pass filter 30B made up of the resistor 212 and the capacitor 214 that are included in the second circuit 200. Thus it is possible to detect frequency components up to the high-frequency components of the input signal in the first circuit 100 and detect low-frequency components of the input signal in the second circuit 200.

The output terminals of the first circuit 100, the second circuit 200, and the transistor 300 for generating the voltage $V_{BB\text{-}DC}$ are connected via the three resistors 310, 312, and 314, and the reference signal having the reference voltage $V_{BB}$ is outputted from the junction point of the resistors 310, 312, and 314. The reference voltage $V_{BB}$ is obtained by superimposing the output voltages of the two processing systems on the predetermined voltage $V_{BB\text{-}DC}$.

Figure 4:
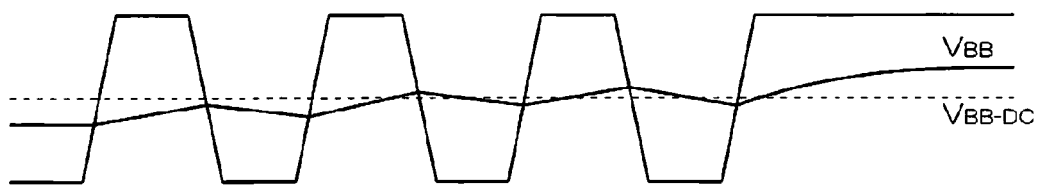
FIG. 4 is an explanatory drawing showing the operations of a first circuit.

FIG. 4 is an explanatory drawing showing the operations of the first circuit 100 and a change of the reference voltage VBB generated when the second circuit 200 is made inoperative. In the first circuit 100, frequency components including the high-frequency components of the input signal are detected. Thus when the voltage of the input signal frequently switches between a low level and a high level, an output voltage reflecting the state of the change is generated. Therefore, the reference signal obtained by superimposing the output voltage on the voltage $V_{BB\text{-}DC}$ varies in voltage according to the frequently changing voltage of the input signal and it is possible to adjust the phase of the signal of a pattern A outputted from the driver output circuit 60.

Figure 5:
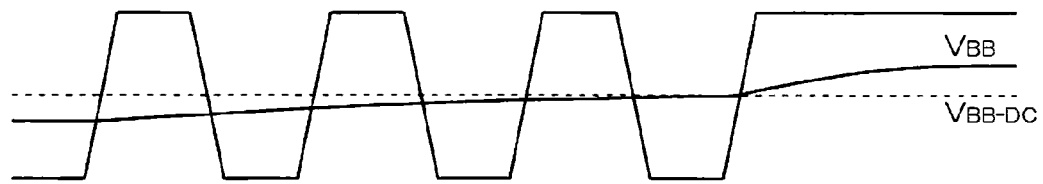
FIG. 5 is an explanatory drawing showing the operations of a second circuit.

FIG. 5 is an explanatory drawing showing the operations of the second circuit 200 and a change of the reference voltage VBB generated when the first circuit 100 is made inoperative. In the second circuit 200, the low-frequency components of the input signal are detected. Thus when the voltage of the input signal is kept at a low level or a high level for a relatively long time, an output voltage reflecting this state is generated. Therefore, the reference signal obtained by superimposing the output voltage on the voltage $V_{BB\text{-}DC}$ varies in voltage so as not to follow the frequently changing voltage of the input signal to a high degree.

The present invention is not limited to the above embodiment and thus various modifications can be made within the gist of the present invention. In the above embodiment, the phase of the signal is adjusted using the driver output circuit 60 including a differential amplifier. A voltage comparator or a variable delay circuit may be used instead of a differential amplifier. When using a voltage comparator, it is preferable to input the output signal of the driver input circuit 10 to a positive input terminal and the reference signal having the reference voltage $V_{BB}$ to a negative input terminal. Further, when using a variable delay circuit, a delay amount is preferably set according to the reference voltage $V_{BB}$.

In the above embodiment, the plurality of low-pass filters 30A, 30B, . . . are used to analyze the contents (frequency characteristics) of the signal pattern of the input signal. Some or all of the low-pass filters may be replaced with band-pass filters or high-pass filters. Moreover, the configuration other than the filters, for example, a plurality of signal patterns (comparison patterns) to be detected may be prepared beforehand and correlation between the input signal and the plurality of comparison patterns may be determined to analyze the contents of the signal pattern of the input signal.

Further, in the above embodiment, although the driver input circuit 10 and the driver output circuit 60 are directly connected to each other in the transmission line driving circuit 1, a delay circuit may be inserted between the driver input circuit 10 and the driver output circuit 60. The insertion of the delay circuit makes it possible to adjust the phase of the signal outputted from the driver input circuit 10.

Further, although the transmission line driving circuit 1 is set between the driver 3 and the transmission line 2 in the above embodiment, in case where the driver 3 (circuit for outputting the input signal) and various circuits (not shown) provided in the previous stage are formed as a part of a single chip or a module, the transmission line driving circuit 1 may be included in the chip or the module. It is thus possible to reduce the size of a circuit including the transmission driving circuit 1 and the driver 3 and the like and reduce the cost due to the simplified manufacturing process and a reduction in the number of components.

INDUSTRIAL APPLICABILITY

According to the present invention, the phase of a signal is adjusted so as to cancel a change of timing before the signal is inputted to a transmission line, so that a loss can be properly compensated. Particularly, since it is not necessary to increase the amplitude of the signal to compensate for a loss, it is possible to easily respond to a higher speed of a transmission signal. The phase is adjusted according to the contents of the signal pattern of the input signal, so that a loss can be properly compensated according to a loss of an actual transmission line.

The invention claimed is:

1. A transmission line driving circuit, comprising:
a signal analyzing unit for analyzing contents of a signal pattern of an input signal; and
a phase adjusting unit for adjusting a phase of the input signal according to an analysis result of the signal analyzing unit in such a direction that cancels a timing deviation caused by a loss occurring when the input signal is transmitted to a transmission line,
wherein the transmission line driving circuit transmits an output signal of the phase adjusting unit to the transmission line, and
wherein the signal analyzing unit has a plurality of filters having different cutoff frequencies for passing a low frequency component of the input signal and a gain adjusting unit for adjusting a gain of an output voltage of the filters and a combining unit for combining output voltages of the plurality of filters after the gain is adjusted by the gain adjusting unit, and
the phase adjusting unit adjusts the phase according to a combined voltage of the combining unit, and
wherein the gain adjusted by the gain adjusting unit is set according to a degree of a signal loss occurring on the transmission line.

2. The transmission line driving circuit according to claim 1, wherein the phase adjusting unit is a differential amplifier that a reference voltage is changed according to an analysis result of the signal analyzing unit.

3. The transmission line driving circuit according to claim 1, wherein the phase adjusting unit is a voltage comparator that a reference voltage is changed according to an analysis result of the signal analyzing unit.

4. The transmission line driving circuit according to claim 1, wherein the phase adjusting unit is a variable delay circuit that a delay amount is changed according to an analysis result of the signal analyzing unit.

5. The transmission line driving circuit according to claim 1, wherein the signal analyzing unit and the phase adjusting unit are included in a chip or a module having a circuit for outputting the input signal.

\* \* \* \* \*